No. 801,765. PATENTED OCT. 10, 1905.
G. S. CARSON.
WEEDER.
APPLICATION FILED JUNE 21, 1905.
Fig. 1.
Fig. 2.
Fig. 3.
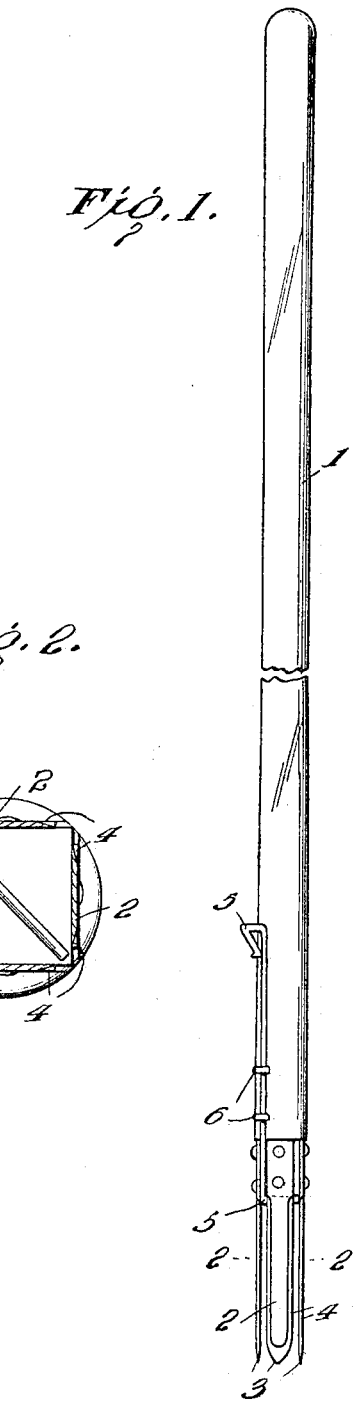
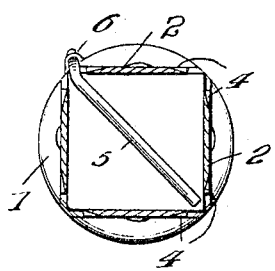
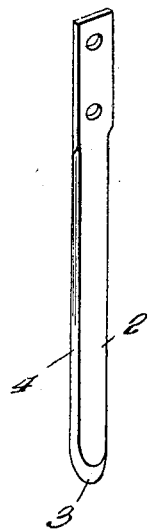
Witnesses
Francis S. Maguire
Inventor
George S. Carson
By
Attorney

UNITED STATES PATENT OFFICE.

GEORGE STEVENSON CARSON, OF IOWA CITY, IOWA.

WEEDER.

No. 801,765. Specification of Letters Patent. Patented Oct. 10, 1905.

Application filed June 21, 1905. Serial No. 266,309.

*To all whom it may concern:*

Be it known that I, GEORGE STEVENSON CARSON, of Iowa City, in the county of Johnson and State of Iowa, have invented certain new and useful Improvements in Weeders; and I do hereby declare the following to be a full, clear, and exact description of the invention, such as will enable others skilled in the art to which it appertains to make and use the same.

The object of this invention is to provide a weeder which, aside from being extremely simple and inexpensive, will cut a clear core regardless of the condition of the ground and effect the removal of the core with the tap-root of the weed.

The invention will be hereinafter fully set forth and particularly pointed out in the claims.

In the accompanying drawings, Figure 1 is a view in side elevation. Fig. 2 is a cross-section on line 2 2, Fig. 1. Fig. 3 is an enlarged view of one of the cutting-blades.

Referring to the drawings, 1 designates a rod or pole, to the lower squared end of which are secured four blades 2, each set at right angles to its neighbors, so that in cross-section they inclose a square area. Each of these blades is made of stiff plate metal of sufficient rigidity to maintain its integrity as against deflection. The free end of each blade is rounded and is also beveled, as at 3, on its outer face, so that all the blades will as they are forced into the ground compress the dirt within the space inclosed by them to such degree that in turning the weeder it will cut a core out of the ground and remove it with the weed in the center. The four blades are also beveled along their longitudinal edges 4, so that in turning the weeder before extracting the size of the hole is not increased. These blades being set at right angles compress the dirt within their inclosed space by the surrounding dirt. All this is accomplished without the use of any auxiliary parts, the four blades being all that is required. The core of earth with the tap-root may be readily removed regardless of the condition of the soil, and should there be any branch roots the same will be readily severed by the longitudinal cutting edges of the blades.

A rod or stiff wire 5, held to pole 1 by keepers 6, with its bent end projected into the space between the blades may be employed to effect the removal of the core and weed from the weeder.

The advantages of my invention will be apparent to those skilled in the art. It will be seen that a weeder constructed in accordance therewith is extremely simple, comprising as it does but four blades secured to a pole or standard, which latter may be of any desired length. Each of the blades is made from stiff metal, sufficiently rigid to prevent bending or deflection. When inserted in the ground they inclose a square area, which is readily severed without danger of unnecessarily enlarging the hole made to remove the root, since the blades do not have a tendency to spread after being forced into the soil. This is due to the fact that the blades are beveled on their outer faces at their lower or entering ends. As the blades are turned the surrounding earth tends to force them more tightly together, insuring thereby not only the retention of the core within the space inclosed by the blades, but the severing thereof at the ends of the latter.

I claim as my invention—

1. A weeder comprising a pole, and a series of blades secured to one end thereof, each blade being set at an angle to its neighbors, and having its lower free end beveled on its outer face.

2. A weeder comprising a pole, and a series of four blades secured to one end thereof, each blade being set at right angles to its neighbors, and having its lower free end beveled on its outer face.

3. A weeder comprising a pole, and a series of four blades secured to one end thereof, each blade being set at right angles to its neighbors, and having its lower free end beveled on its outer face, said blades being also beveled along their longitudinal edges.

In testimony whereof I have signed this specification in the presence of two subscribing witnesses.

GEORGE STEVENSON CARSON.

Witnesses:
J. W. GRIM,
C. B. CRAIN.